United States Patent [19]

Avellar et al.

[11] 3,871,577

[45] Mar. 18, 1975

[54] METHOD AND APPARATUS FOR ADDRESSING FFT PROCESSOR

[75] Inventors: Karl B. Avellar, Ellicott City; James A. Ross, Aberdeen, both of Md.

[73] Assignee: Westinghouse Electric Corporation, Pittsburgh, Pa.

[22] Filed: Dec. 13, 1973

[21] Appl. No.: 424,532

[52] U.S. Cl. .............................................. 235/156

[51] Int. Cl. .......................... G06f 7/38, G06f 15/34

[58] Field of Search .................. 235/156; 340/172.5

[56] References Cited

UNITED STATES PATENTS

| | | | |
|---|---|---|---|
| 3,584,781 | 6/1971 | Edson | 235/156 |
| 3,601,592 | 8/1971 | Cutter et al. | 235/156 |
| 3,721,812 | 3/1973 | Schmidt | 235/156 |
| 3,754,128 | 8/1973 | Corinthios | 235/156 |
| 3,767,905 | 10/1973 | Garde | 235/156 |

*Primary Examiner*—Felix D. Gruber
*Assistant Examiner*—David H. Malzahn
*Attorney, Agent, or Firm*—J. B. Hinson

[57] ABSTRACT

Method and apparatus for reducing the hardware requirements and complex control of an in-place Fast Fourier Transform (FFT) processor by a unique repetitive arrangement of the stored data pattern of N complex data points or record samples in the same predetermined order each time after each iteration or pass of the data through an FFT arithmetic unit. This results in the final output sequence of the calculated data points automatically having the same format as the initial input sequence. Four data memories are utilized in pairs in conjunction with the arithmetic unit wherein the calculated samples are stored in successive iterations. For example, the first pair of memory units are selectively addressed for receiving the calculated results in a predetermined order and then used as the input means for consecutively feeding its contents to the arithmetic unit in the next pass at which time the second pair of memories are selectively addressed in the same predetermined manner for storing the calculated data. Thus the memories alternate as input and output memory devices always having the data stored therein in the same predetermined order while having a subsequent serial readout.

9 Claims, 8 Drawing Figures

EVEN C+2

| | | | |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

ODD C+2

| | | | |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

C+1

| | | | |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

METHOD AND APPARATUS FOR ADDRESSING FFT PROCESSOR

BACKGROUND OF THE INVENTION

1. Field of the Invention

This invention relates generally to real time digital apparatus using the Cooley-Tukey algorithm for calculating the Fast Fourier Transform (FFT) and more particularly to the method and means for storing and reordering the data pattern for successive iterations of an in-place FFT processor.

2. Description of the Prior Art

In a paper entitled "An Algorithm for the Machine Calculation of Complex Fourier Series," *Mathematics of Computation*, 19, 297–301, 1965, J.W. Cooley and J. W. Tukey presented a simplified algorithm for calculating Fourier series coefficients on a digital computer. As a result, there appeared special purpose hardware designed specifically for performing the FFT algorithm. Such apparatus is generally outlined in "Fast Fourier Transform Hardware Implementations-an Overview," *IEEE Transactions on Audio and Electro Acoustics*, Vol. 17, No. 2, 104–107, June, 1969. One type of processor referred to therein is the sequential processor which utilizes a single arithmetic unit performing $(N/2)\log_2 N$ operations repetatively where N is the number of complex data points selected for a sampling interval. A further type of sequential processor in which the calculated results are simultaneously stored and retrieved in an in-place operation in dual buffers in successive iterations, moreover, is shown and described in U.S. Pat. No. 3,673,399 issued to Peter J. Hancke, et al. Addressing of the buffers uses a single binary address counter and sequential bit complementing for simultaneously addressing both buffers. Parity checking of the binary counter output address controls multiplexing logic to selectively address the buffers to store the calculated results in the desired buffer storage locations. Still another type of sequential processor is disclosed in U.S. Pat. No. 3,704,826 issued to Jean-Claude Constantin wherein N complex samples of an input signal are stored in a sequential access circulating memory. Both processors referenced in the cited patents calculates two points simultaneously in a "butterfly operation."

SUMMARY OF THE INVENTION

It is an object of the present invention to provide a memory arrangement for FFT apparatus wherein the complex data points as they are calculated in "butterfly" fashion are fed to memory locations in such a pattern that at the end of the required number of successive iterations or passes, the data points automatically appear in the same order as they were initially entered.

Briefly, the present invention is directed to the method and apparatus for indexing pairs of simultaneously calculated complex data points appearing in a dual data stream in a predetermined arrangement to a pair of storage memories. During the first half of the iteration time period for every pass, N/4 points in one data stream are loaded into first even numbered address memory locations while the simultaneously calculated N/4 points in the other parallel data stream are addressed and stored in first odd numbered address memory locations while during the second half of the same iteration period, the remaining N/4 points appearing in said one data stream are stored in second even numbered address memory locations and the remaining N/4 points appearing in said other data stream are loaded in second odd numbered memory locations. Preferably, the first even numbered memory locations and the second odd numbered locations exist in one memory of said pair of memories with the second even numbered memory locations and the first odd numbered memory locations exist in the other memory of said pair of memories; however, during sequential readout of both memories simultaneously in the order stored, the odd numbered points are mutually interchanged from one data stream to the other. The exact same pattern of storage and input to the arithmetic unit is repeated for successive iterations. As a result, the trigonometric coefficients also fed to the arithmetic unit appear in a more simplified regularly recurring order such that the addressing can be accomplished by a simple shift register. The output data sequence always coincides with the input data sequence irrespective of the number of complex data points utilized as long as the required number of $N/2 \log_2 N$ passes of the data through the arithmetic unit are made.

DESCRIPTION OF THE PREFERRED EMBODIMENTS

Figure 1:
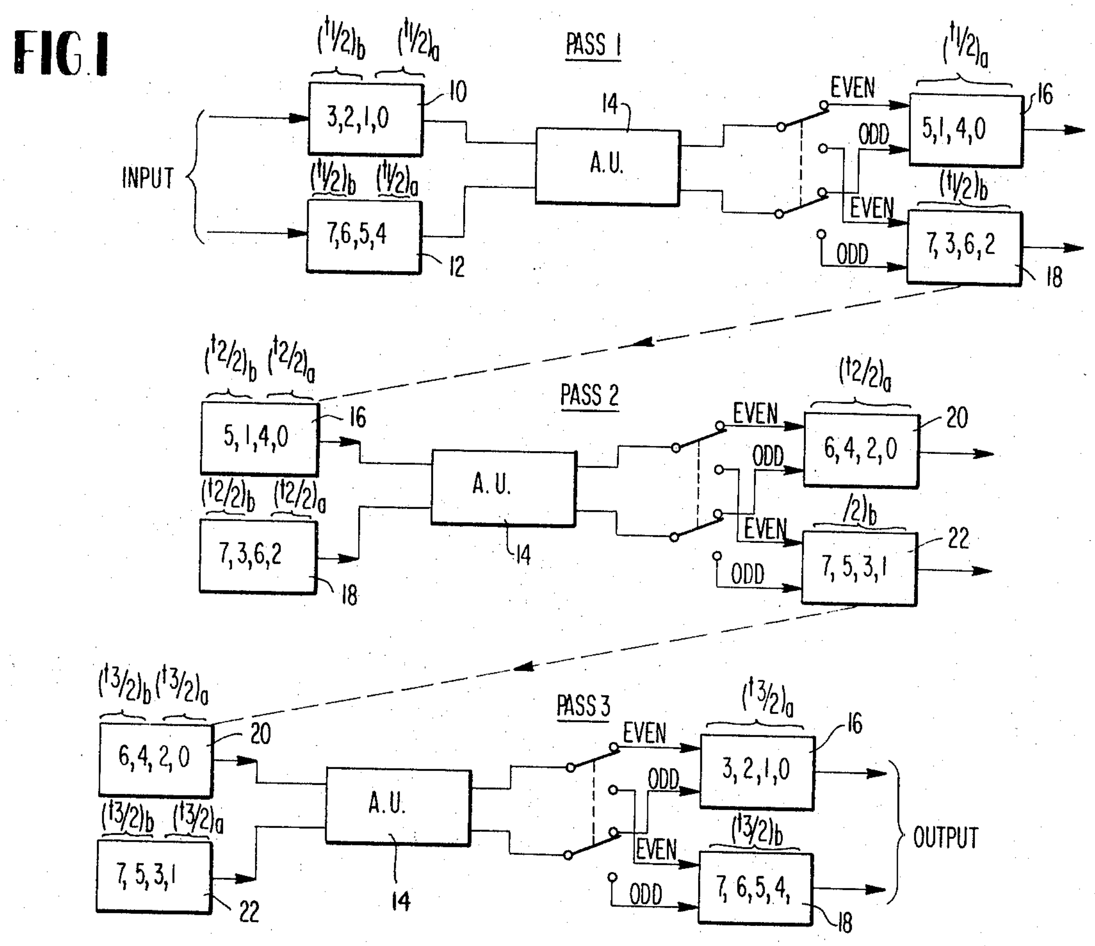
FIG. 1 is a simplified block diagram of a basic embodiment of the subject invention.

Basically, the Fast Fourier Transform (FFT) algorithm calls for combining the Fourier coefficients for two interleaved complex data samples to yield the coefficients for the composite set. Thus, the coefficients for the even numbered samples and those for the odd numbered samples can produce a single set of coefficients for all the samples. The mathematics for the FFT is well known in the art; however, further details of the mathematical algorithm and its manipulation can readily be understood by reference to the prior art referenced above and additionally for example to U.S. Pat. No. 3,517,173 issued to M. J. Gilmartin, Jr., et al.

The FFT computation consists of simultaneously calculating pairs of Fourier coefficients $A(n)$ and $A(n+N/2)$ by performing the following two operations:

$$A(n) = \tfrac{1}{2}[A_0(n)+A_1(n)W^{n/N}] \qquad 1.$$

$$A(n+N/2) = \tfrac{1}{2}[A_0(n)-A_1(n)W^{n/N}]. \qquad 2.$$

These equations can be simplified as, $$A(n) = B(n)+C(n)W^{n/N} \quad \text{and} \qquad (3)$$

$$A(n+N/2) = B(n)-C(n)W^{n/N} \qquad (4)$$

where A($n$), B($n$), C($n$) and $W^{n/N}$ are complex numbers, $n$ varies from 0 to N/2-1 and where N samples are selected during each sampling time interval.

The operands B($n$) and C($n$) therefore comprise complex data points of an N point transform. Initially the data is supplied to the processor via dual data stream input means as two sets of data of N/2 points each wherein the respective point in each set is consecutively fed into an arithmetic unit whereupon the required computation is performed providing consecutive pairs of simultaneous intermediate output points. In an in-place FFT processor, the calculated intermediate output points are stored as two sets in selective memory locations which data is then consecutively read out and fed back to the arithmetic unit on the next pass or iteration. This recirculation of calculated data points is repeated N/2 $\log_2 N$ times. Due to the nature of the FFT process, certain reordering of the calculated data points must normally be effected by selective control of the processor. Depending upon the reordering required, the complexity of the control is effected. Accordingly, the present invention is directed to the method and means of arranging the memory locations for the calculated points in the same way for each data pass such that the output data sequence corresponds exactly to the input data sequence.

Referring now to FIG. 1, reference numerals 10 and 12 represent, for example, input buffers for storing N/2 complex data points or samples each. Considering for example an $N = 8$ point transform, input buffer 10 is adapted to store one half of the input points and which are arbitrarily numbered 0, 1, 2 and 3 while input buffer 12 is adapted to store input points 4, 5, 6 and 7. The data points 0, 1 . . . 3 and 4, 5 . . . 7 are sequentially fed into an FFT arithmetic unit 14 in pairs in two separate data streams such that points 0 and 4 are simultaneously fed to the arithmetic unit followed by points 1 and 5, then 2 and 6, and finally 3 and 7. Following each sequential FFT calculation, the points 0 and 4, 1 and 5, etc. are fed out of the arithmetic unit 14 in consecutive pairs also in a dual data stream. This output data is recirculated and fed back to the input of the arithmetic unit in an in-place operation; however, the present invention has particular reference to the manner in which the data points are stored and retrieved through the successive iterations.

In the first embodiment, for example, during one half $(t_1/2)_a$ of the first pass $t_1$ data points 0 and 4 are respectively fed to the even and odd address locations of the memory 16, while data points 1 and 5 are respectively fed to the next succeeding even and odd locations. During the next half $(t_1/2)_b$ of the first pass interval, the output data from the arithmetic unit 14 is switched to the memory 18. More particularly, input data points 2 and 6 are fed respectively to the even and odd address locations of memory 18 followed by input data points 3 and 7 being addressed to the succeeding even and odd memory locations.

During the second pass $t_2$, the data points stored in memories 16 and 18 are sequentially fed back simultaneously to the arithmetic unit 14 in the order stored i.e. 0 and 2, 4 and 6, 1 and 3, and 5 and 7, with the second pass data points then being stored in a second pair of memories 20 and 22. In the second pass $t_2$, the sequence of storing the calculated data points is the same as in the first pass. During the first half $(t_2/2)_a$ of the second pass $t_2$, data points 0 and 2 are fed to the arithmetic unit 14 providing new output data points 0 and 2 which are addressed to the first even and odd address locations of the memory 20 while the second pair of data points 4 and 6 are calculated and addressed to the second even and odd address locations, respectively. During the second half $(t_2/2)_b$ pass $t_2$, data points 1 and 3 are fed from the respective memories 16 and 18 to the arithmetic unit 14 whereupon the output data points 1 and 3 are fed to the first even and odd address locations of memory 22 while the second set of data points 5 and 7 are calculated and fed to the second even and odd address locations 22.

For an N = 8 point transform, three (3) iterations or passes are required to perform the required operation. Accordingly, the data points stored in the memories 20 and 22 are now sequentially fed back to the arithmetic unit 14 sequentially in the order stored such that during the first half $(t_3/2)_a$ of pass $t_3$, data points 0 and 1 and 2 and 3 are fed to the arithmetic unit 14 with the resultant data points being fed back into the memory 16 in the same order as described with respect to prior two passes. Accordingly, data points 0 and 1 are fed to the first even and odd address location of memory 16 while data points 2 and 3 are fed to the second even and odd address locations. During the second half $(t_3/2)_b$ of the third and final pass, points 4 and 5 are respectively fed to the even and odd address locations of memory 18 while the last pair of data points 6 and 7 are fed to the next even and odd address location. The data points now located in the memory 16 and 18 exist in the same original format as the data points in the input buffers 10 and 12. Since the method of transferring and storing data is the same for each iteration, the control of the processor becomes greatly simplified in comparison with prior art practice.

Where it is desirable to use respective shift registers to implement each of the storages for the calculated data points, it becomes unfeasible to utilize the arrangement shown in FIG. 1 since it is difficult, if not impossible, to simultaneously load two points simultaneously with subsequent sequential readout, which in effect is what is required for the memories 16, 18 20 and 22 shown in FIG. 1. To overcome this apparent inherent limitation of the relatively simple embodiment of the inventive concept as set forth in FIG. 1, reference is now made to FIG. 2 wherein the arithmetic unit 14 alternately couples to two pairs of serial memory units 24 and 26 or 28 and 30. Whereas during any one-half of the iteration period for a single pass both output data line means from the arithmetic unit 14 were fed into the same memory in the first embodiment shown in FIG. 1, and then were switched to the other memory, the present embodiment has the data line means alternately feeding into opposite memory units of each pair with a switching or reversal of inputs after one-half of the iteration period; however, the output from each memory pair during subsequent sequential readout is multiplexed such that the respective odd numbered data points in the dual data streams are mutually interchanged during readout. This will become apparent when the embodiment shown in FIG. 2 is considered together with the tabulation shown in FIG. 3.

Figure 2:
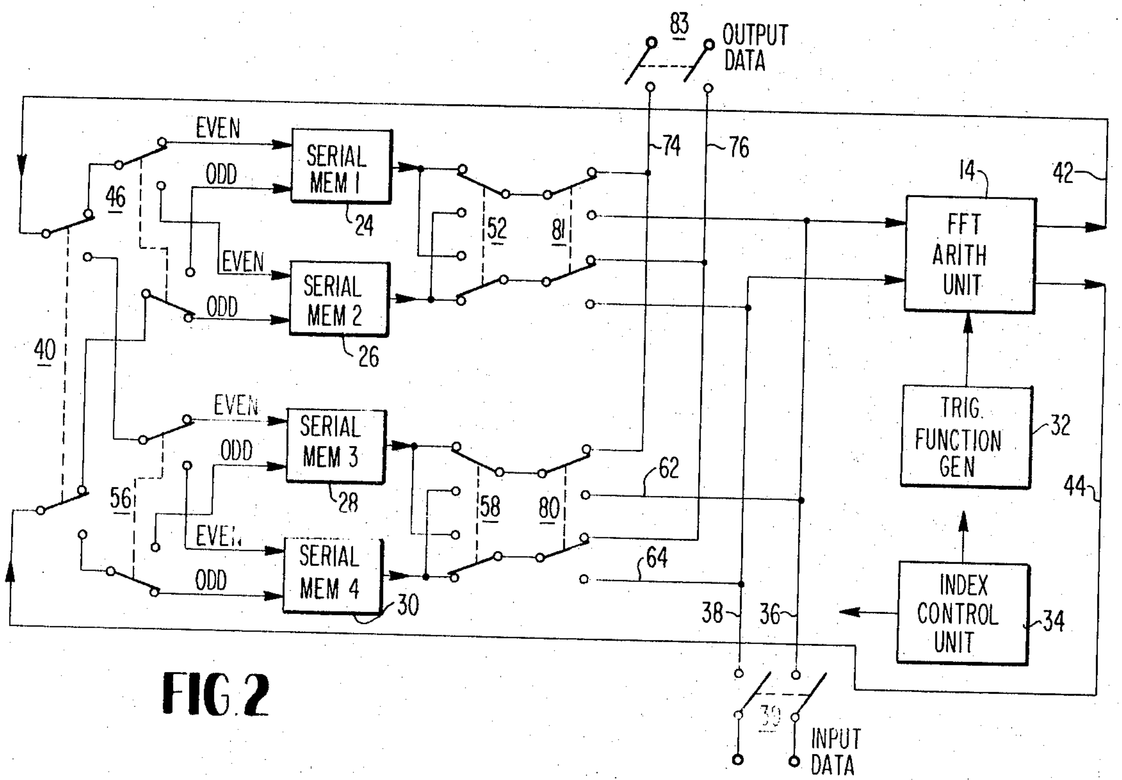
FIG. 2 is a block diagram illustrative of a second embodiment of the subject invention.
Figure 4:
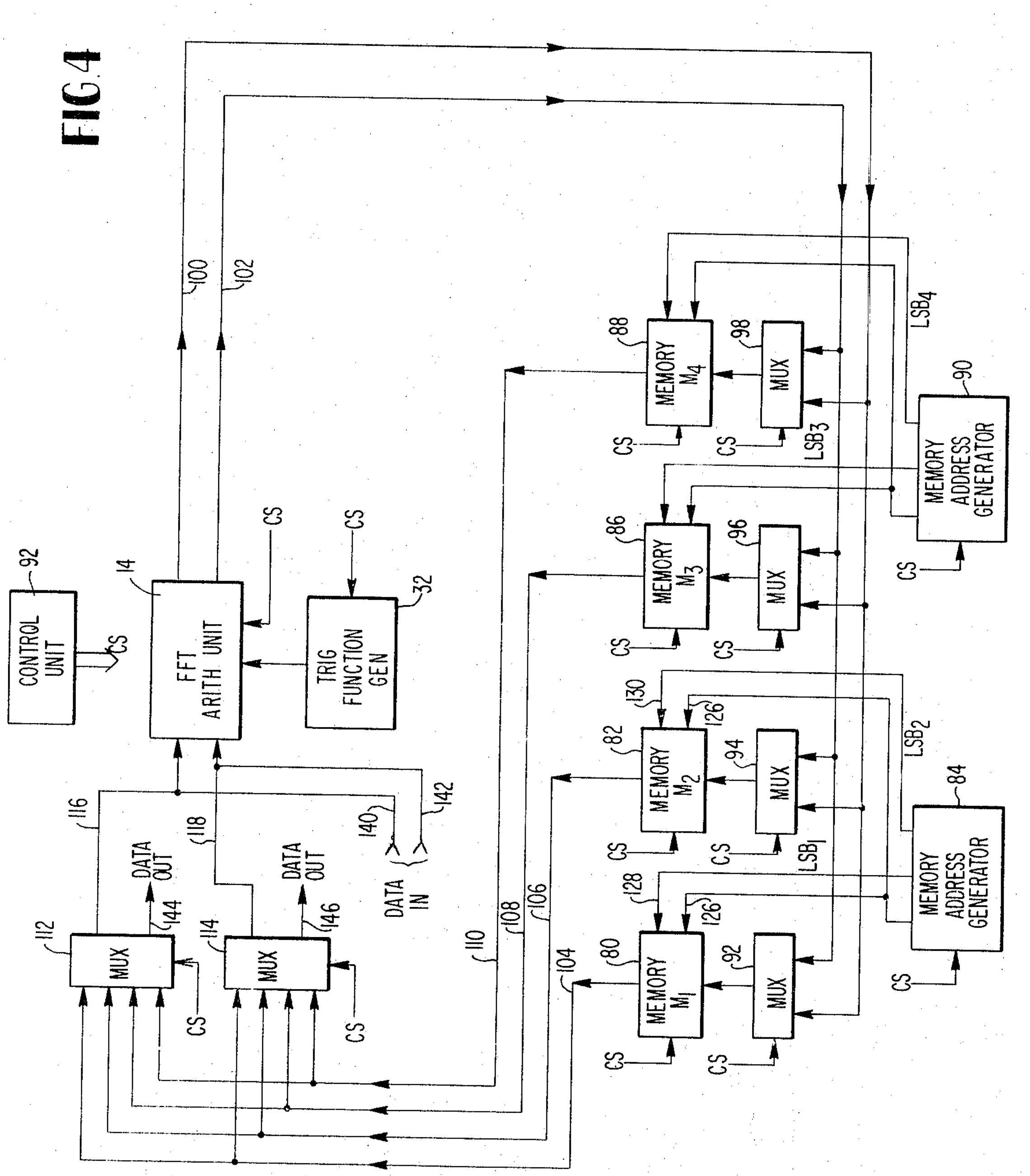
FIG. 4 is a block diagram illustrative of a third and preferred embodiment of the subject invention also utilizing the data arrangement as shown in FIG. 3.

Considering now FIG. 2, a trigonometric function generator 32 is shown coupled to the FFT arithmetic unit 14 for applying trigonometric coefficients $W^{n/N}$. Also, an indexing control unit 34 is shown in FIG. 2, it being understood that suitable interconnections well known to those skilled in the art exist between the various circuit elements for operating the elements in timed relationship. Also, the embodiment shown in FIG. 2 illustratively discloses simple electrical switch means for the transfer of data. However, it should be noted that in reality high speed switching apparatus presently known to those skilled in the art, one example of which is disclosed in FIG. 4, is contemplated. In the subject embodiment, serial memories 24 and 26 operate as one pair of memories while memories 28 and 30 operate as a second pair. The pairs of memories operate such that during one pass of an FFT operation, one pair operates as input memories to the FFT arithmetic unit 14 while the other pair operate as output memories with the functions being reversed for the next subsequent pass. Considering an N = 16 point transform, N/2 points 0, 1, . . . 7, example, would be applied to binary complex data input line means 36 while the other N/2 input points 8, 9, . . . 15 would be applied over input data line means 38. Switch means 39 merely designates input enabling means during the first pass and becoming disabled thereafter. For the odd numbered passes, switch means 40 couples output data line means 42 and 44 to serial memories 24 and 26 while during the ever number passes, output data line means 42 and 44 are coupled to the memories 28 and 30.

Considering the first pass $t_1$ during the first half $(t_1/2)_a$ of the iteration period, input data points 0 and 8, 1 and 9, 2 and 10, 3 and 11 are sequentially operated upon in the FFT arithmetic unit 14 and fed to the memories 24 and 26 in the following fashion. Assuming that data output line means 42 carries data points 0, 1, 2, 3, etc. while output line means 44 is adapted to carry data points 8, 9, 10, 11, etc., the first intermediate output pair of calculated data points 0 and 8 will be respectively coupled to the memories 24 and 26 such that the data point 0 is addressed to and stored in the first even numbered address location of memory 24 while data point 8 is addressed to and stored in the first odd numbered memory address location of memory 26. In a like manner, the next calculated data point 1 of the second intermediate output pair will be addressed to and stored in the second even numbered address location of memory 24 while simultaneously calculated data point 9 will be addressed to and stored in the second odd numbered address location in memory 26. In a like manner, the third and fourth intermediate output data points 2 and 3 in the same data stream will be coupled to succeeding even numbered locations in memory 24 while corresponding third and fourth data points 10 and 11 appearing in the other data stream will be simultaneously addressed to succeeding odd numbered locations in memory 26. During the second half $(t_1/2)_b$ of the iteration time of the first pass $t_1$, however, the switch means 46 reverses state and data points 4, 5, 6 and 7 in the same data stream as points 1, 2, 3 and 4 are now loaded into the even address locations of memory 26 while respective points 12, 13, 14, 15 in the other data stream are successively loaded into the remaining odd numbered address locations in the memory 24.

Figure 3:
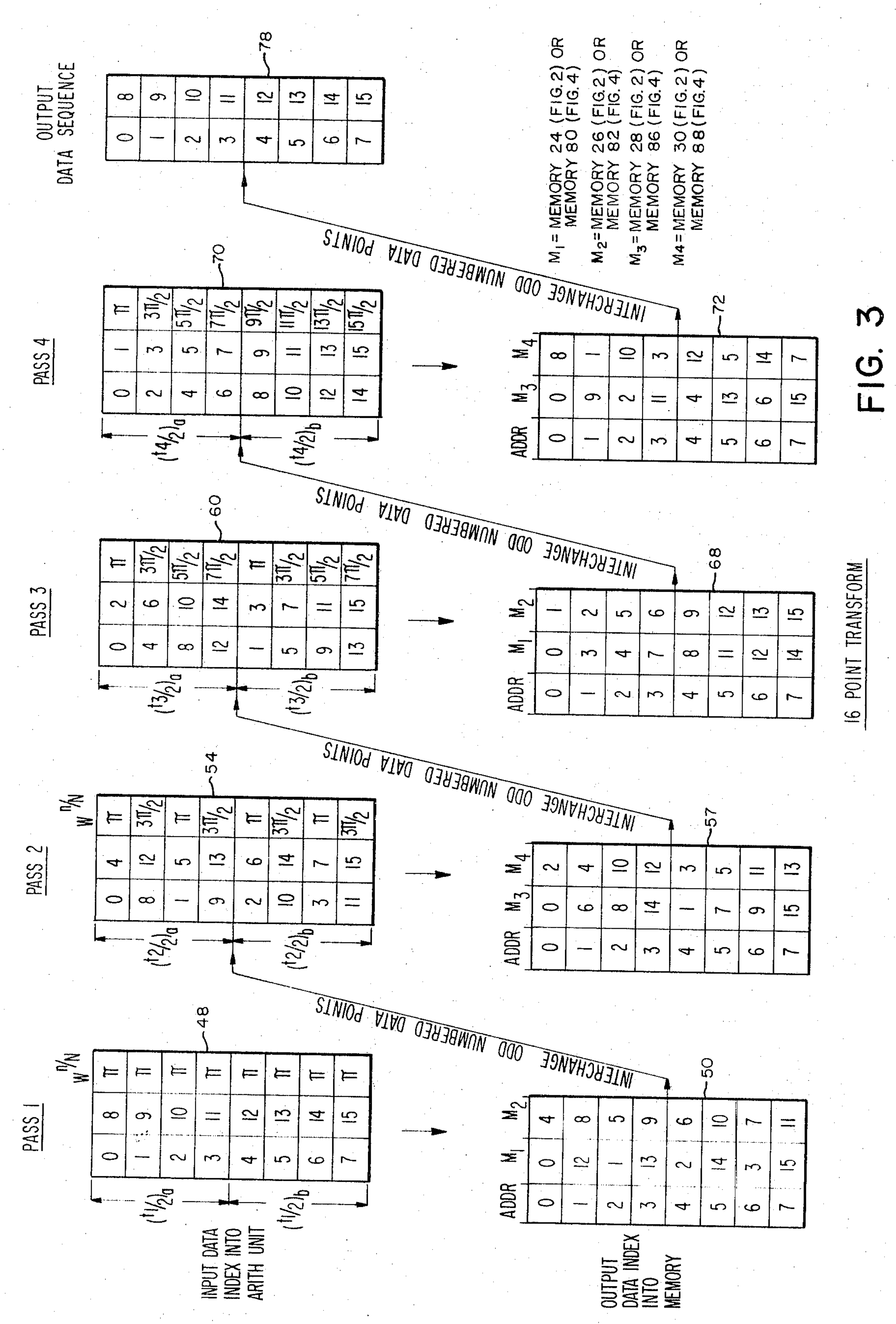
FIG. 3 is a series of tabulations illustrating the memory arrangement and the indexing of the input data fed to an FFT arithmetic unit for a 16 point transform utilizing the embodiment shown in FIG. 2.

In order to understand the operation of the embodiment shown in FIG. 2, reference is now made to FIG. 3. The input data pattern applied to the arithmetic unit 14 together with the required trigonometric coefficients $W^{n/N}$ is shown by the tabulation 48. Tabulation 50 indicates the data points addressed and stored in memories 24 and 26, i.e. $M_1$ and $M_2$, respectively.

For the second pass switch means 52 operates to simultaneously feed points 0 and 4 from the $M_1$ and $M_2$ memories 24 and 26 first but then immediately switch to reverse the mutual position of points 12 and 8 in the dual data stream and all succeeding odd numbered data points coming from the sequential readout of $M_1$ and $M_2$ memories 24 and 26. Thus points 0, 8, 1, 9, 2, 10, 3 and 11 are fed in a common data stream to the arithmetic unit 14 via data line means 54 while consecutive points 4, 12, 5, 13, 6, 14, 7 and 15 are fed in another common data stream to the FFT arithmetic unit 14 as indicated by the tabulation 54. Switch means 40 now couple output data line means 42 and 44 to memories 28 and 30, i.e. $M_3$ and $M_4$. Thus during the first half of the second pass $t_2$ which corresponds to the time $(t_2/2)_a$ data points 0, 8, 1 and 9 as calculated are fed to the even numbered memory address locations of $M_3$ memory 28 while the points 4, 12, 5 and 13 are loaded into the odd numbered address locations of $M_4$ memory 30. During the second half $(t_2/2)_b$ of the period $t_2$, switch means 56 operates to first couple data point 2 into the first even numbered memory address location of $M_4$ memory 30 while simultaneously calculated point 6 is loaded into the first odd numbered memory address location of $M_3$ memory 28. At the end of the second pass memories 28 and 30 are loaded with data points in the order shown in tabulation 57.

During the third pass $t_3$, memory units 28 and 30 sequentially operate in conjunction with the multiplexing switch means 58 to couple data points as shown in tabulation 60 to the arithmetic unit 14 via data line means 62 and 64. The third set of intermediate output data points as calculated during the third pass are now loaded, however, back into $M_3$ and $M_4$ memories 24 and 26 as shown by the tabulation 68. Again a subsequent sequential output along with the mutual interchange of odd numbered points achieved by multiplex operation of the switch means 52 provides an input data sequence pattern to the arithmetic unit as shown by tabulation 70 for the fourth and final pass $t_4$ required for an N = 16 point transform. The calculated data points for the fourth pass $t_4$ are next fed back into the $M_3$ and $M_4$ memories 28 and 30 as shown by the tabulation 72. The final output data sequence pattern corresponds to tabulation 78 and is coupled to data line means 74 and 76 by action of the multiplex switch means 58 and movement of switch means 80 to the output position. It can be seen by reference to tabulation 78 that the arrangement of the data points 0 . . . 15 for the output data sequence is in the same order as the input data sequences as shown by the tabulation 48. The unique recurrence of the same indexing order for each pass automatically results in a final output data point pattern which is identical to the initial input data point pattern.

The tabulations 48, 54, 60 and 70 for passes 1, 2, 3 and 4, respectively as shown in FIG. 3, additionally include a tabulation of the trigonometric coefficient $W^{n/N}$ applied to the arithmetic unit 14 from the trigonometric function generator 32 for each of the pairs of data points applied thereto. It can be seen for example that all of the pairs of data points in the first pass $t_1$ are calculated with the trigonometric coefficient $W^{n/N}$ of $\pi$ . In the second pass $t_2$, a repetitive sequence of $W^{n/N} = \pi$ and $W^{n/N} = 3\pi/2$ is applied. In the third pass, a repetitive sequence of $\pi$ , $3\pi/2$, $5\pi/2$ and $7\pi/2$ is required for the data format realized. Finally, the last and final pass requires a sequence of $\pi$, $3\pi/2$, $5\pi/2$, $7\pi/2$ . . . $15\pi/2$. It can be seen that the order in which the trigonometric coefficients are ordered as the number of passes increase is a regular ascending progression which is repetitive indicating that the control of the trigonometric function generator 32 becomes relatively simple with the data pattern utilized herein.

Referring now to FIG. 4, there is disclosed an embodiment of the subject invention similar to FIG. 2 except that the switching function of the data is carried out by means of multiplexer circuits which are well known logic elements fabricated as semi-conductor integrated circuit elements readily available on the market place as off-the-shelf functional blocks.

The embodiment shown in FIG. 4 is adapted to provide the same data pattern as illustrated in the tabulations shown in FIG. 3. The instant embodiment includes a first pair $M_1$ and $M_2$ of complex data point memories 80 and 82 commonly controlled by a memory address generator 84 and a second pair $M_3$ and $M_4$ of complex data point memories 86 and 88 under the common control of a second memory address generator 90. The memory address generators 84 and 90 in turn receive their control from a control unit 92 by suitable control signal leads CS connected thereto. The memories 80, 82, 86 and 88 being operated in pairs in connection with the respective memory address generators each are connected to a respective 2:1 multiplexer 92, 94, 96 and 98 with a respective one of the two inputs coupled to the data output line means 100 and 102 from the FFT arithmetic unit 14. The multiplexers 92, 94, 96 and 98 receive control signals from the control unit 92 by appropriate interconnections CS to selectively couple complex data points from data output line means 100 and 102 to the memory pairs 80 and 82 or 86 and 88. The memories 80, 82, 86 and 88 include sequential access and readout means with respective output data line means 104, 106, 108 and 110, connected to a respective input of a pair of 4:1 multiplexers 112 and 114 having individual data line means 116 and 118 adapted to feed pairs of complex data points from either the memories 80 and 82 or 86 and 88 to the arithmetic unit 14 by appropriate control signals applied thereto from a control unit 92. In addition to selectively coupling input data feed from the sequential readout of one or the other pairs of memories 80 and 82 or 86 and 88, the multiplexers 112 and 114 additionally operate to interchange the odd numbered data points in the two data streams as outlined in the tabulations of FIG. 3.

Where for example in the first pass of an FFT operation, data points 0, 1, 2, . . . 7 appear on output data line means 102 and wherein data points 8, 9, 10, . . . 15 appears on data line means 100, the multiplexer 92 and 94 in combination with the memory address generator 84 is adapted to index the data into the memories 80 and 82 in the format shown by the tabulation 50. Consecutive pairs of calculated data points 0 and 8, 1 and 9, 2 and 10, and 3 and 11 appear consecutively in two simultaneous data streams such that for example points 0, 1, 2 and 3 appear on output line means 100 while points 8, 9, 10 and 11 appear on output line means 102. During first half of the iteration period $t_1$, points 0, 1, 2, and 3 are consecutively loaded into the even numbered addresses of memory 80, while the corresponding points 8, 9, 10 and 11 are consecutively loaded into the odd numbered addresses of memory 82. During the second half of the iteration $t_1$, the multiplexers 92 and 94 switch inputs and calculated data points 4, 5, 6 and 7 appearing on output line means 100 are consecutively loaded into the even numbered addresses of memory 82 while points 12, 13, 14 and 15 are loaded consecutively into the odd numbered addresses of memory 80. Following the writing-in of the data points, they are consecutively read-out in pairs beginning from the first and continuing to the last and fed to the multiplexers 112 and 114 which also act to interchange the odd numbered data points as they are again fed into the FFT arithmetic unit 14 for example as shown by tabulation 54 of FIG. 3.

In order to more fully understand the operation of the addressing and storing of the data points in memory pairs 80 and 82 or 86 and 88 and subsequent readout of the stored data points for the next pass of the data through the FFT arithmetic unit, reference is additionally now made to FIG. 5 and FIGS. 6A–6C.

Figures 5, 6A, 6B, 6C:
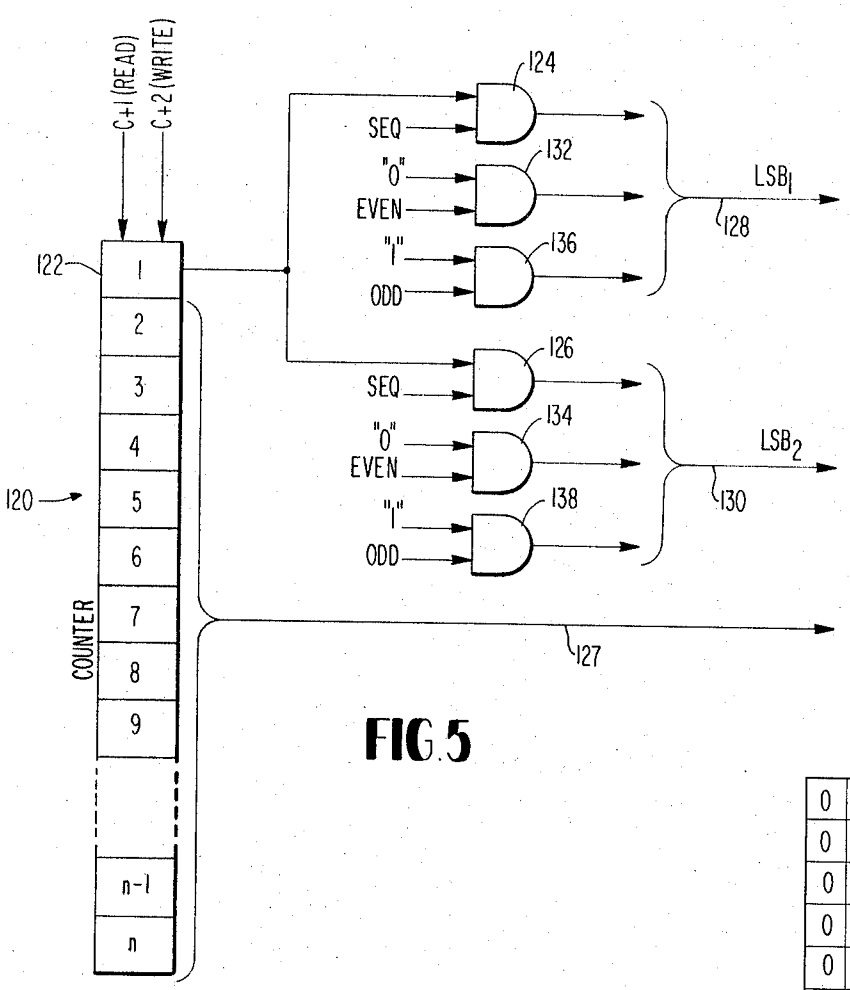
FIG. 5 is a partial electrical circuit diagram illustrative of the memory address generator shown in FIG. 4.
FIGS. 6A, 6B and 6C are four bit binary number tabulations helpful in understanding the operation of the memory address generator shown in FIG. 5.

Addressing of the memory pairs for example memory 80 and 82, is easily accomplished where the memory address generator 84 is configured as an $n$ bit binary counter 120 adapted to have two count inputs C+1 and C+2 applied thereto from the control unit 92 for counting by increments of 1 or 2, respectively. The first or least significant bit ($LSB_1$) 122 is coupled to a pair of AND gates 124 and 126 which are adapted to be enabled by a sequential "Seq" count control signal from the control unit 92. The remaining bits of the counter 120 feed into a control buss 127 which is commonly coupled to both memory units 80 and 82. Thus when simultaneous sequential readout of the memories 80 and 82 is desired, a count by 1 signal C+1 is applied to the counter 120 and the count progresses. The least significant bit line $LSB_1$ 128 and $LSB_2$ 130 provide a zero starting point for a sequential readout according to, for example, the binary count by 1 tabulation as shown by FIG. 6A.

Where however it is desired to address either the odd or even numbered addresses of the memories 80 and 82, it simply requires a count by 2 signal C+2 to the counter 120 and the proper binary value of the least significant bit at the start of the count. By reference to FIG. 6B, it is immediately evident that for an even numbered count by 2 in a binary code, the first bit is a binary 0, while an odd count by 2 code always has the first bit a binary 1 (FIG. 6C). Accordingly, the memories 80 and 82 can be either addressed to the odd numbered location or the even numbered location by the proper indexing of the least significant bit address to the memories. By applying a constant binary 0 to a pair of AND gates 132 and 134 for the respective least significant bit line 128 and 130, an even address command from the control unit 192 will effect the proper entry of the data. It should be noted, however, that AND gates 132 and 134 are not enabled simultaneously, but mutually alternately such that while one memory e.g., memory 80 is being addressed in the even addresses, the other memory 82 is being addressed in the odd address locations. After one half of an iteration period, the reverse occurs. The odd address location is provided by a third pair of AND gates 136 and 138 having a constant binary 1 applied thereto with an "odd" numbered count control signal applied from control unit 92 for enabling the gates at which time the proper least significant bit is generated for proper address of the respective memory. The control unit 92 is selectively coupled to the various processor elements to provide a data format which is identical insofar as the way in which the data is entered into a pair of memories and in which it is then reentered into the FFT unit 14.

Completing the consideration of the embodiment shown in FIG. 4, the input data, for example as shown in tabulation 48 shown in FIG. 3 is applied to input data line means 140 and 142 while the output data sequence is taken from the multiplexers 112 and 114 in the format shown by tabulation 78 in FIG. 3 on data line means 144 and 146.

Thus the method of arranging the memory organization of an in-place FFT processor consists in consecutively computing two simultaneous complex data points from two simultaneous inputs applied in a dual data stream and repetatively placing the results of the FFT calculation into a pair of memories such that for N data points, during the first half of the iteration time period for a single pass, N/4 points in one data stream are loaded into first even numbered address memory locations while the corresponding N/4 points in the other data stream are addressed and stored in first odd numbered address memory locations, while during the second half of the same iteration period, the following N/4 data points in said one data stream are addressed into second even numbered address memory locations and the remaining N/4 data points in said other data stream are addressed and stored in second odd numbered address memory locations. Preferably the first even and odd memory locations exist in separate memories of said memory pair. The same may be said for the second even and odd numbered memory locations obviously. If the last recited order of stored points exist, the odd numbered data points stored require mutual interchange in the respective data stream read out prior to input into the FFT arithmetic unit for the next pass or iteration. By repeating the exact same process for the required number of iterations ($N/2 \log_2 N$) for a selected number (N) of complex input data points in the sampling period, the output data sequence will automatically correspond to the input data sequence thereby simplifying complex controls. Furthermore, the trigonometric coefficients required in each iteration of the FFT process corresponds to a simple repetitive sequence in such an order that a simple address counter can be employed.

While the invention has been particularly shown and described with reference to what is at present considered to be the preferred embodiments thereof, it will be understood by those skilled in the art that various changes in the form and details may be resorted to without departing from the spirit and scope of the invention.

We claim as our invention:

1. The method of indexing complex data points in an FFT processor operating in place for automatically supplying an output data point pattern in a dual data stream identical to the input data point pattern, comprising in combination:

initially inputting a sequential set of simultaneous N/2 pairs of N complex data points in a dual data stream to the FFT processor during the first of a predetermined number ($N/2 \text{ Log}_2 N$) iterations required to perform an FFT calculation;

sequentially calculating a dual data stream set of pairs of complex data points corresponding to intermediate Fourier coefficients in an FFT arithmetic unit during successive iterations;

feeding the dual data stream set during each iteration period from said FFT arithmetic unit to memory means by 1. sequentially addressing and storing one half of the data points in one data stream of the dual data stream from said FFT arithmetic unit during the first half of the iteration period for each iteration to first even numbered memory locations of said memory means,
2. sequentially addressing and storing one half of the data points in the other data stream of the dual data stream from said FFT arithmetic unit during said first half of the iteration period for each iteration simultaneously with said one data stream to first odd numbered memory locations of said memory means,
3. sequentially addressing and storing the other half of the data points in said one data stream of the dual data stream from said FFT arithmetic unit during the second half of the iteration period for each iteration to second even numbered memory locations of said memory means, and
4. sequentially addressing and storing the other half of the data points in said other data stream of the dual data stream from said FFT arithmetic unit during said second half of the iteration period for each iteration simultaneously with said one data stream to second odd numbered memory locations of said memory means;

folowing the first iteration period sequentially reading out pairs of complex data points from said memory means in the order stored during the immediate previous iteration period in a dual data stream and feeding said dual data stream from said memory means back to said FFT arithmetic unit as an input in accordance with said aforesaid feeding step during each successive intermediate iteration period; and sequentially reading out pairs of complex data points in a dual data stream in the order previously stored from said memory means following the final iteration period.

2. The method of indexing as defined by claim 1 wherein the steps of addressing and storing the mutually corresponding one half of the data points in both said one and said other data stream comprises loading the data points in said one and said other data stream in consecutive even and odd numbered memory locations respectively of a first memory, and wherein said steps of addressing and storing the other half of the mutually corresponding data points during the second half of the iteration period comprises loading the data points in said one and said other data stream in consecutive even numbered and odd numbered memory locations respectively of a second memory unit.

3. The method of indexing as defined by claim 1 wherein said step of storing said one half of the data samples in said one data stream during the first half of each iteration period comprises addressing and storing said data points in consecutive even numbered memory locations, beginning from the first, of a first memory;

said step of addressing and storing said one half of the data points in the other data stream during said first half of each iteration period comprises addressing and storing said data points in consecutive odd numbered memory locations, beginning from the first, of a second memory;

said step of addressing and storing said other half of the data points in said one data stream during the second half of each iteration period comprises addressing and storing the data points in consecutive even numbered memory locations, beginning from the first, of said second memory;

said step of addressing and storing said other half of the data points in said other data stream during the second half of each iteration period comprises addressing and storing said data points in consecutive odd numbered memory locations, beginning from the first, of said first memory;

wherein said step of sequentially reading out pairs of complex data points comprises reading out mutually corresponding pairs of complex data points simultaneously in respective data streams from said first and second memory unit, beginning from the first stored point and continuing to the last; and wherein said step of feeding said dual data stream back to said FFT arithmetic unit and said step of sequentially reading out pairs of data points additionally includes interchanging the mutually corresponding odd numbered data points from one data stream to the other prior to input to the FFT arithmetic unit during successive intermediate iterations and during the final output of the data points following the last iteration period.

4. An FFT processor having calculated complex data points stored and retrieved in an in-place operation, comprising in combination:

an FFT arithmetic unit operable in accordance with an externally applied selected trigonometric coefficient to accept consecutive pairs of complex data points simultaneously inputted thereto in a dual data stream and provide consecutive pairs of intermediate output data points (Fourier coefficients) simultaneously in a dual data stream in successive iterations according to a predetermined FFT algorithm;

input means coupled to said FFT arithmetic unit for supplying consecutive pairs of complex data points as an initial input thereto;

first digital memory means having even and odd numbered memory locations selectively coupled to the output of said FFT arithmetic unit during first alternate iteration periods and including selectively controlled address means for selectively storing simultaneous pairs of intermediate output data points consecutively calculated and being operable during the first half of each of said first alternate iteration periods to consecutively address and store the first half of the data points appearing in one data stream of said dual data stream in a first plurality of even numbered memory locations and to consecutively address and store the first half of the mutually corresponding data points appearing in the other data stream of said dual data stream in a first plurality of odd numbered memory locations, and first means operable at the end of the first half of the respective iteration period to switch the data flow into said memory means from said FFT arithmetic unit and consecutively address and store the second half of the data points appearing in said one data stream in a second plurality of even numbered memory locations and to consecutively address and store the second half of the data points appearing in said other data stream in a second plurality of odd numbered memory locations, said means being operable at the end of the respective iteration period to switch the data flow back to its original state at the beginning of the next iteration period;

first selectively controlled read-out means coupling said first digital memory means to the input of said arithmetic unit during the immediately succeeding iteration period following each first alternate iteration period and consecutively supplying the pairs of complex data as stored to the FFT arithmetic unit as another input dual data stream;

second digital memory means, having even and odd numbered memory locations selectively coupled to the output of said FFT arithmetic unit during second alternate iteration periods relative to said first alternate iteration periods and including selectively controlled address means for selectively storing simultaneous pairs of intermediate output data points consecutively calculated and being operable during the first half of each of said second alternate iteration periods to consecutively address and store the first half of the data points appearing in said one data stream of said dual data stream in a first plurality of even numbered memory locations and to consecutively address and store the first half of the data points appearing in the other data stream in a first plurality of odd numbered memory locations, and second means operable at the end of the first half of the respective iteration period to switch the data flow into said second memory means from said FFT arithmetic unit and consecutively address and store the second half of the data points appearing in said one data stream in a second plurality of even numbered memory locations and to consecutively address and store the second half of the data points appearing in said other data stream in a second plurality of consecutive odd numbered memory locations, said second means being operable at the end of the respective iteration period to switch the data flow back to its original state at the beginning of the next iteration period;

second selectively controlled read-out means coupling said second digital memory means to the input of said FFT arithmetic unit during the immediately succeeding iteration period following each second alternate iteration period and consecutively supplying the pairs of complex data as stored to the FFT unit as still another input dual data stream;

dual data stream output means selectively coupled to one of said first and second read-out means for providing an output dual data stream as consecutive pairs of complex data as stored after the final iteration period, having a data sequence identical to the sequence of the original input data stream.

5. The FFT processor as defined by claim 4 wherein said first and second digital memory means each comprises a pair of serially indexed memories.

6. The FFT processor as defined by claim 5 wherein the respective first plurality of even numbered and second plurality of odd numbered memory locations of said first and second memory means are located in one memory of each said pair of memories and the respective second plurality of even numbered and first plurality of odd numbered memory locations are respectively located in the other memory of each said pair of memories.

7. The FFT processor as defined by claim 5 wherein respective said first plurality of even numbered memory locations and the second plurality of odd numbered memory locations are located in a first memory of each of said pair of memories and wherein respective first plurality of odd numbered locations and the second plurality of even numbered memory locations are located in a second memory of each of said pair of memories, and wherein said read-out means includes means operable to interchange the mutually corresponding odd numbered data points from one data stream to the other of said dual data stream.

8. The FFT processor as defined by claim 7 wherein said FFT arithmetic unit additionally includes first and second data line means for transmitting respective data streams of said dual data stream to said pairs of memories, respective digital multiplexor means coupling said first and second data line means to said pairs of memories, and first and second digital multiplexor means having respective output data line means coupled to the input of said FFT arithmetic unit and input data line means coupled to the output of each of said pairs of memories.

9. The FFT processor as defined by claim 8 wherein said first and second memory means additionally includes a respective memory address generator coupled to pairs of memories, said generators each having means for indexing consecutive odd or even memory locations upon selective command during a write mode and indexing sequential memory locations upon selective command during a read mode.

* * * * *